United States Patent [19]

Ladusaw

[11] Patent Number: 4,508,987
[45] Date of Patent: Apr. 2, 1985

[54] HERMETIC COMPRESSOR INCLUDING A TERMINAL BLOCK AND THERMAL PROTECTION RETAINER MEANS

[75] Inventor: William T. Ladusaw, Louisville, Ky.

[73] Assignee: General Electric Company, Louisville, Ky.

[21] Appl. No.: 597,683

[22] Filed: Apr. 6, 1984

[51] Int. Cl.³ .............................................. H02K 11/00
[52] U.S. Cl. ................................. 310/68 C; 361/22; 361/418; 361/426
[58] Field of Search .................... 361/22, 25–27, 361/331, 334, 380, 386, 388, 389, 392, 417, 418, 419, 426; 174/52 R; 339/91 R, 119 R; 310/68 R, 68 C, 68 B

[56] References Cited

U.S. PATENT DOCUMENTS

4,181,393 1/1980 Lill .................................. 310/68 C

Primary Examiner—G. P. Tolin
Attorney, Agent, or Firm—Frank P. Giacalone; Radford M. Reams

[57] ABSTRACT

In a hermetic compressor there is provided a resilient retainer member adapted to removably secure a terminal receptacle block assembly and a thermal overload protector relative to the compressor casing. The receptacle block assembly is adapted to engage conductor pins of an electrical terminal secured to the upper wall of the casing while the overload protector is arranged on a substantially flat portion of the upper wall of the casing. The retainer member is arcuately shaped with its downwardly diverging end portions adapted to engage the receptacle block and thermal protector respectively. A downward force on the apex of the retainer member forces its end portions to securely hold the receptacle block in electrical contact with the conductor pins and thermal protector in intimate contact with the upper wall of the compressor casing.

4 Claims, 5 Drawing Figures

HERMETIC COMPRESSOR INCLUDING A TERMINAL BLOCK AND THERMAL PROTECTION RETAINER MEANS

BACKGROUND OF THE INVENTION

This invention relates to a hermetic motor compressor and more particularly to a retaining system for removably securing the motor overload protector and terminal receptacle block assembly relative to the compressor casing.

Current terminal assemblies for making electrical connections to the motor component of a hermetic motor compressor unit includes a terminal connector having a plurality of conductor pins projecting through spaced apertures in a cup-shaped metal body member. The cup-shaped metallic body member is adapted to be inserted in an opening in the hermetic casing and secured thereto. A terminal block assembly is plugged in over the conductor pins of the terminal connector. During operating of the compressor motor the vibrations caused by compressor operation may in some instances cause the terminal assembly to become disengaged from the conductor pins causing de-energization of the compressor. In other instances the terminal assembly may be inadvertently moved relative to the conductor pins when the compressor is serviced. A method of solving this problem is to provide some sort of mechanical fastening device between the terminal block and terminal pin assembly.

It is also desirable, in hermetic motor compressors, to provide a thermal protection device which stops the compressor when the temperature within the case approaches the degree which could damage the insulation of the motor windings. In many of the present day refrigerant compressors the thermal protector are mounted within the sealed hermetic case. While this arrangement is effective in sensing motor temperatures it however causes some problems when the protector itself malfunctions. This results in the entire compressor being discarded since in most instances it is not practical to disassemble a hermetic compressor assembly to repair its internal parts. One solution to this problem is to mount the thermal protection device externally. In this instance a mechanical fastening means must be provided which insures that the thermal protection device remain in intimate contact with the compressor casing.

SUMMARY OF THE INVENTION

It is an object of the present invention to provide a retaining system which will cause the terminal block assembly to remain in electrical engagement with the compressor conductor pins and also insure that the compressor thermal protector is intimately held against the compressor casing.

Another object of the invention is to provide a retaining system which securely holds the terminal block assembly and thermal protector securely relative to the compressor casing while at the same time allowing their removal from their associated position on the compressor casing.

By the present invention there is provided a hermetic motor compressor including a resilient retainer member adapted to removably secure a terminal receptacle block assembly and a thermal protector relative to the compressor. An electric terminal is disposed in an opening formed in the top wall of the compressor. Conductor pins are arranged in the terminal including end portions projecting outwardly from the casing. The terminal receptacle block assembly includes female terminals arranged to receive the conductor pins of the electric terminal. The thermal protector includes a base wall dimensioned to conform to the casing upper wall.

The terminal receptacle block assembly and thermal overload are removably secured relative to the casing by an arcuate spring clamp formed of stiffly flexible metal stock having end portions diverging downwardly from a central apex. The clamp is provided with a central opening dimensioned to receive a stud member secured to the upper wall of the compressor casing. A downwardly extending projection on one end portion of the clamp is adapted to engage a depression on the upper wall of the thermal protector, while a holding area on the other end portion of the clamp is dimensioned to engage the terminal receptacle block assembly. A post member threadably engages the stud member for applying pressure on the central portion of the clamp. The downward pressure on the clamp causes its end portions to forceably engage the terminal block and thermal protector to removably secure the terminal block assembly relative to the conductor pins and for removably securing the thermal overload relative to the compressor upper wall.

DESCRIPTION OF THE PREFERRED EMBODIMENT

Figure 1:
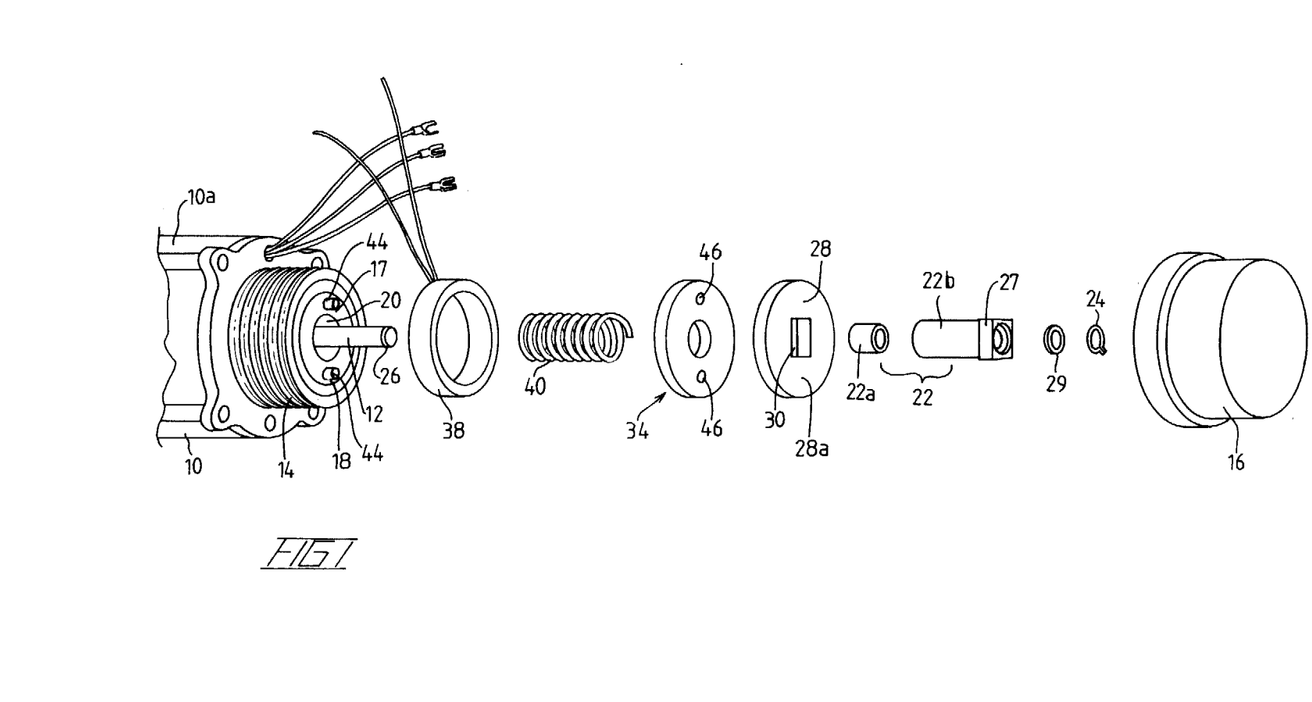
FIG. 1 is an elevational view of a hermetic motor compressor incorporating the preferred embodiment of the present terminal block and thermal protection retainer means.

Referring now to the drawings, wherein a preferred embodiment of the invention has been shown and particularly to FIG. 1, the basic components of the refrigerant hermetic motor compressor assembly 10 are of conventional construction and include an outer casing 12 housing a motor compressor unit comprising an upper motor section 14 and a lower compressor section 16. As shown in FIG. 1 the compressor casing 12 is mounted in its vertical position. The casing 12 of the compressor is arranged with its lower portion located in a resilient mounting member 18 which is positioned on the support or base wall 19. To insure the vertical stability of the compressor casing 12 means are provided to support the casing at its upper end. To this end the compressor is provided with a stud 20 extending upwardly from and secured to the upper wall 22 of the compressor casing 12. A support structure is provided which includes a post 24 supported on the base 19 in a vertical position. A cantilevered arm 26 extends perpendicular to the vertical post 24 to a position where it overlies the compressor and more particularly the stud 20. Located on the arm 26 is a resilient grommet 28 having an opening 30 which axially aligns with the stud 20. The grommet 28 is dimensioned to seat in a convex side of a disk-shaped spacer 32 which as will be explained later is secured to the stud 20. With the compressor in its installed or operating position the stud 20 is arranged in its cooperating opening 30 of grommet 28 to thereby stabilize the vertical axis of the compressor.

In order to electrically connect the motor 14 to an electrical power source there is provided a connector consisting of an inverted cup-shaped terminal connector 34 mounted directly to the top wall 22 of the casing 12. The terminal connector 34 in connection with the present invention, is provided with a plurality of conductor pins 36. The conductor pins 36 are positioned to project through the terminal 34 in both directions. The inner projecting ends of conductor pins 36 are connected to the motor 14 in any suitable manner (not shown). The outer projecting ends of conductor pins 36 receive a terminal or receptacle block assembly 37 which includes female connector (not shown) adapted to be plugged into engagement with the conductor pins 36.

In order to provide thermal protection for the motor 14 within the casing 12 there is provided a thermal overload protection assembly 38 including an inverted inner cup-shaped housing 40 in which a thermal responsive switch 42 (FIG. 4) is arranged and an outer cover 44. The switch 42 is designed to break the current to the compressor motor whenever a predetermined high temperature is sensed. This thermal protector may be of any well-known type which is adapted to open a switch upon sensing a predetermined high temperature. The lower circumferentially disposed edge portion 46 of cover 40 is in a substantially flat plane which serves to maintain it in intimate contact with a flat wall portion 48 (FIG. 2) formed in the upper wall 22 of the casing. As shown best in FIG. 4 when the lower edge portion 46 of cover 40 is positioned on flat wall portion 48 the switch 42 is in effect positioned in a pocket 50 containing air which is exposed directly to the temperature of portion 48 of the wall 22. It is important therefore that the edge portion 46 remain in intimate contact with wall portion 48 since ambient air entering the pocket 50 will effect the temperature sensed by the thermal switch 42. The outer cup-shaped cover 44 of protector assembly 38 substantially surrounds the side and top walls of the inner housing 40. The cover 44 is provided with an opening 52 through which electrical connection is made to the switch 42 and a top wall 54. The cover 44 is provided with an inner circumferentially disposed ledge 56 which engages an outer circumferentially disposed shoulder 58 on the side wall adjacent the lower edge 46 of housing 40. A downward force on cover 44 will be transferred through the ledge 56 and shoulder 58 to the circumferentially edge portion 46 to insure its intimate contact with wall portion 48.

Figure 2:
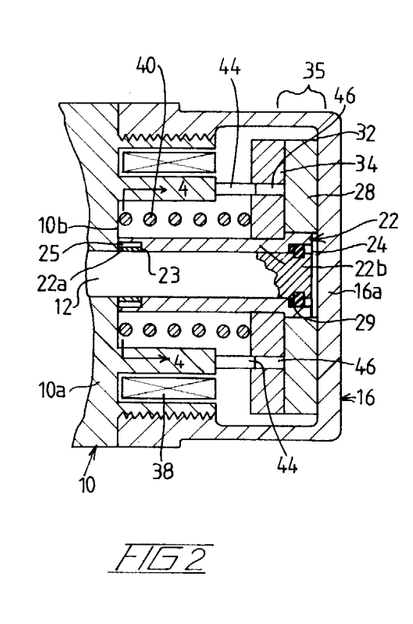
FIG. 2 is an exploded perspective drawing showing the various cooperating elements incorporated in the present retainer system.
Figures 3, 4:
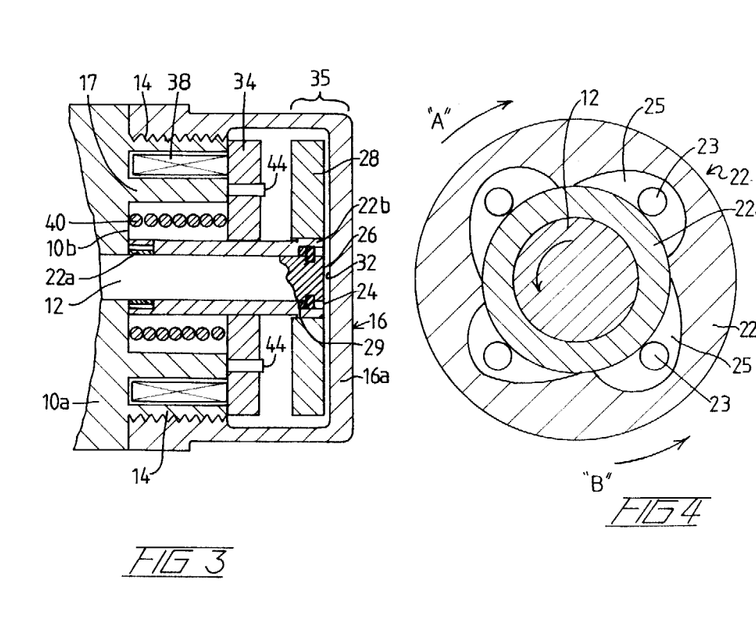
FIG. 3 is a plan view taken along line 3—3 of FIG. 1.
FIG. 4 is an enlarged sectional view taken along line 4—4 of FIG. 3.
Figure 3:
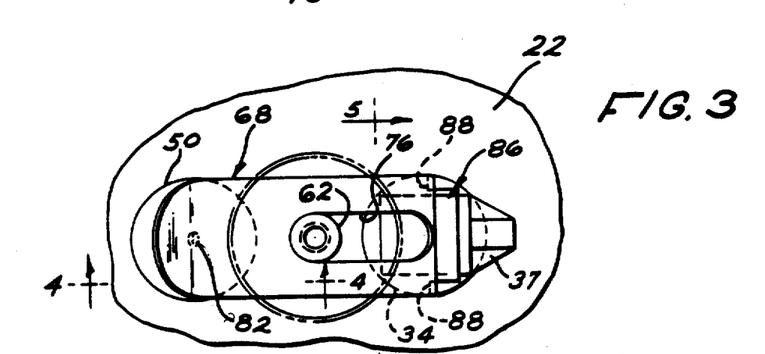
Figure 4:
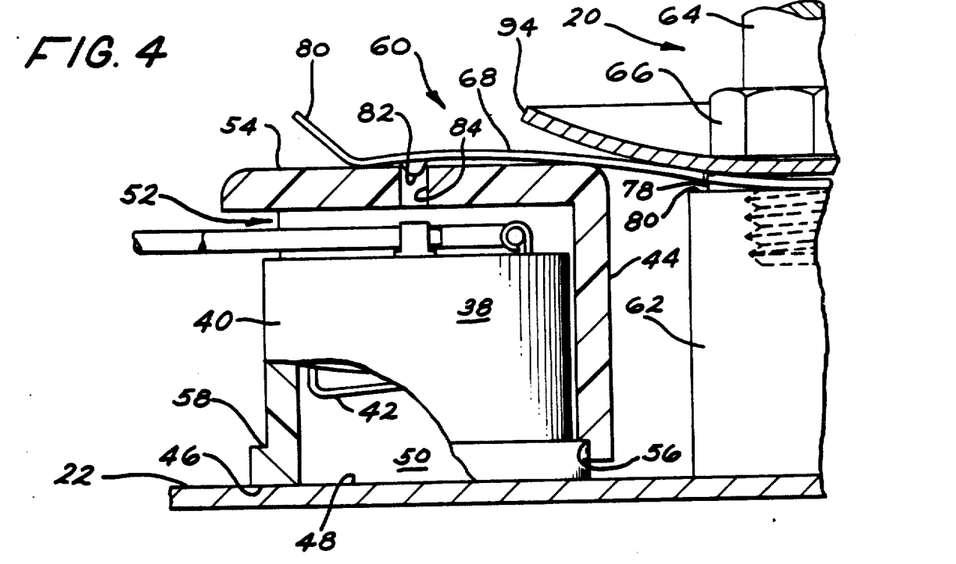
Figure 5:
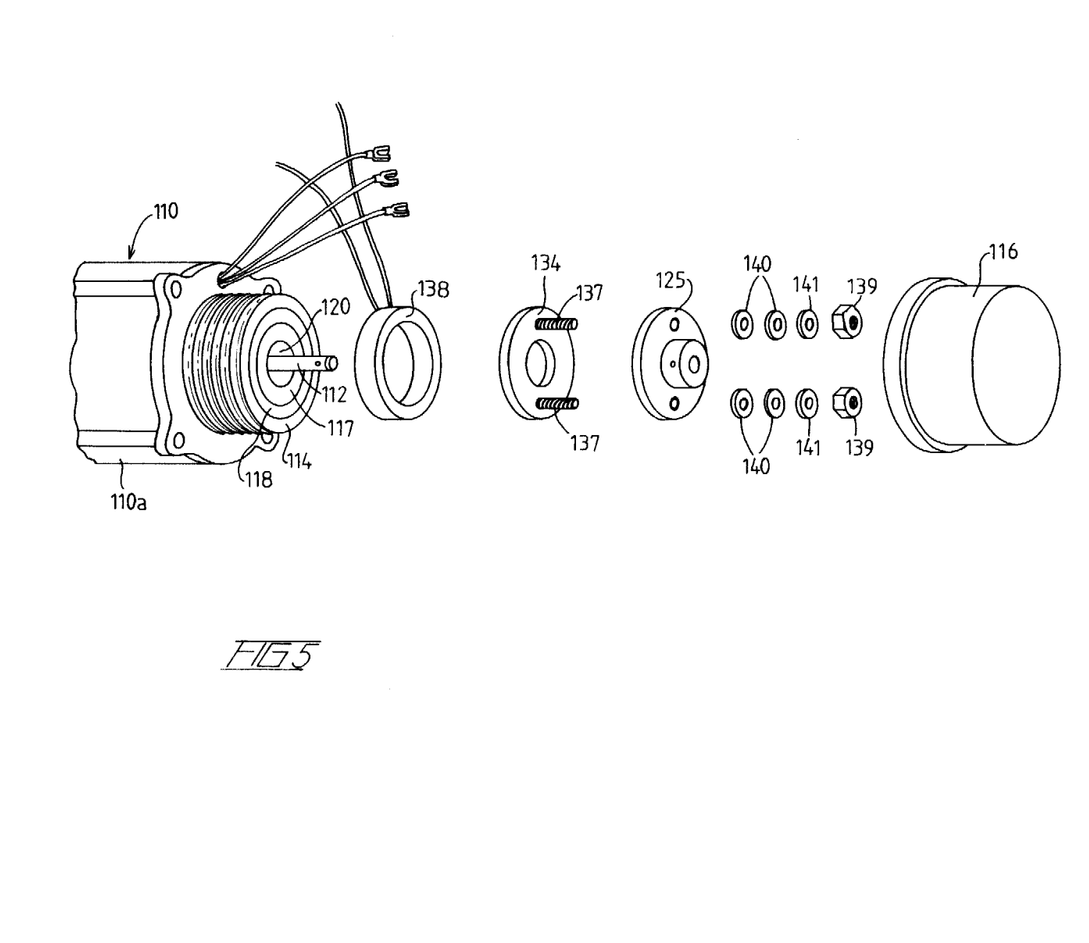
FIG. 5 is a sectional view taken along line 5—5 of FIG. 3.
Figure 6:
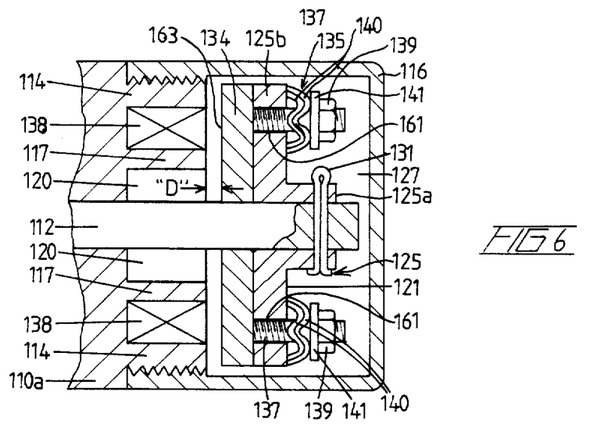
Figure 7:
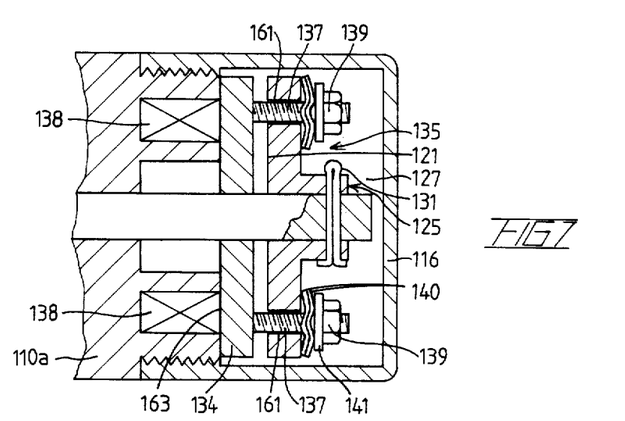
Figure 8:
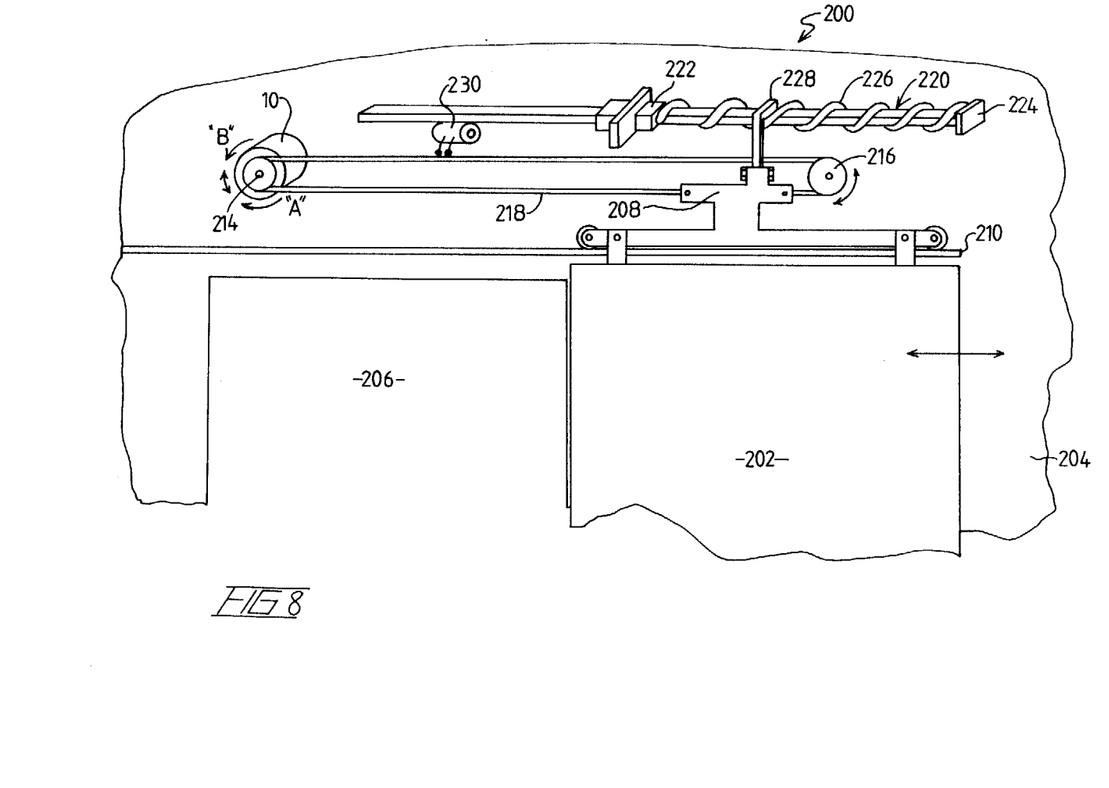
Figure 9:
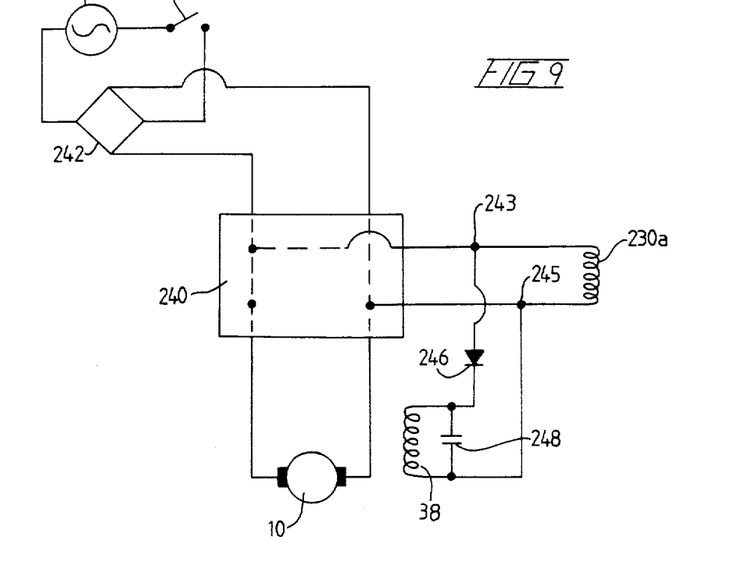
Figure 10:
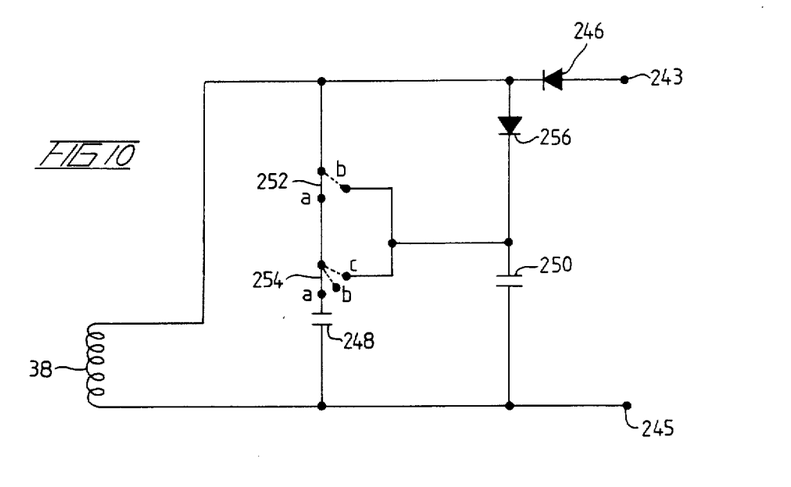

By the present invention a retaining assembly 60 is provided for removably securing the thermal overload protector assembly 38 and receptacle block 37 relative to the surface 48 and connector 37 respectively as they are arranged on compressor casing. The retaining assembly 60 of the present invention employs the upper compressor mounting stud 20 as an integral part. To this end as shown in FIGS. 1-3 the mounting stud 20 on the compressor is formed to include center post 62 which is secured to the upper casing wall 22 and a removable threaded post member 64. The removable post member 64 includes an enlarged nut like portion 66 having a depending male bolt portion which threadably engages the threaded female upper end of the center post 62. A spring clamp or retainer member 68 made of relatively stiff resilient material is adapted to be mounted on the center post 62 and secured thereto by post member 64. In this position the retainer member 68 is adapted to securely engage both the thermal protector 38 and receptacle block assembly 37 as will now be fully described. The clamp 68 is arcuate in its relaxed position as viewed in FIG. 2 and includes leg portions 70 and 72 which diverge outwardly and downwardly from its central apex portion 74 to its free ends. An opening 76 formed in the retainer member 68 is slotted or elongated and originates in the center or apex 74 of the arc of retainer member 68 and extends into the leg portion 70. The upper end of center post 62 is formed to include a narrowed neck portion 78 having an axial dimension substantially the same as the thickness of the member 68. The narrowed neck portion 78 provides a shoulder 80 on which the retainer member 68 is supported. The width of the slotted or elongated opening 76 is dimensioned to receive the neck portion 78 of the center post 62. In the assembled position the retainer member 68 is in effect trapped between the spacer 32 and the shoulder 80 provided by the neck portion 78. The elongated center opening 76 in the clamp 68 when arranged on the neck portion 78 of the center post 62 allows lateral movement of the retainer member 68 relative to the axis of the post 62 so as to permit proper orientation relative thereto as will be explained later. The end of leg 72 of the retainer member 68 is provided with a downwardly projecting boss 82 which is dimensioned to engage a depression 84 in the upper wall 54 of the cover member 44. The end of leg 70 of the retainer member 68 is formed to provide a V-shaped configuration whose bottom or apex portion 86 engages the upper wall portion of the terminal block assembly 37. The end of the leg 70 is further formed to include depending tabs or side lips 88. The tabs 88 are spaced apart so as to engage the side walls of the terminal block assembly 37. With the terminal block assembly 37 secured to the conductor pins 36 the tabs 88 in effect prevent pivoting or rotational movement of the spring retainer member 68 about the center post 62. In the present embodiment there are three equally spaced conductor pins 36 and accordingly it may be possible to insert the terminal block in a misaligned rotated position. To this end the tabs 88 prevent this from occurring since they are dimensioned to straddle the side walls of the terminal block 37. In the event the terminal block is improperly oriented or rotated relative to the conductor pins the tabs 88 will contact the upper wall of the receptacle block and apex 86 of V-shaped portion will not contact the upper wall of the terminal block. This is an immediate visual indication that the terminal block 37 is improperly installed relative to the conductor pins 36. As viewed in FIG. 1 with the retainer member 68 arranged on the center post 62 of the compressor and the terminal block in its proper position relative to the conductor pins 36 the apex 86 of the V-shaped portion is positioned on the upper surface of the terminal block 37 and the tabs 88 are located along the side walls of terminal block assembly 37. In this position the other end 72 of member 68 is positioned over on the wall 54 of the thermal protector cover 44 with the boss 82 located in the depression 84.

In one process of assembling the retaining member 68 relative to the receptacle block and protector the threaded center post 64 is screwed down onto the post 62 so that the nut 66 of post member 64 causes the spacer 32 to securely engage the apex 74 of clamp 68 and compress the ends 70 and 72 of spring retainer member 68 relative to the protector 38 and receptacle block 37 respectively. The clamp 68 resting on shoulder 80 in this position because of the axial dimension of neck portion 78 may be moved laterally together with protector 38 through opening 76 relative to the center post 62 to insure that the thermal protector 38 is located on the flat portion 48 of the cover 22 as explained above and the apex 86 of V-shaped portion arranged on the receptacle block relative to the conductor pins in a position which will prevent rocking motion of the terminal block.

This arrangement applies sufficient pressure to the receptacle block 37 through V-shaped portion 86 of end 70 to insure its engagement with the conductor pins 36 and at the same time end 72 engaging the upper wall 54 of the thermal protection cover 44 to insure that the thermal protector 38 is always in constant intimate contact with the upper wall portion 48 of the casing.

While an arrangement has been provided for securely holding the terminal block assembly and motor protector relative to the compressor casing 12 it should be noted that due to the flexibility of the retainer member 68 and its ability to move laterally due to opening 76, it is possible in this present arrangement to remove the thermal protector assembly 38 and terminal receptacle block without disassembling or removing the retainer member 68 from the stud 20. Further, it should be noted that the retainer member 68 may be installed on the post 62 as described above prior to the installation of the receptacle block 37 on conductor pins 36 and also prior to positioning the protector assembly 38 on the flat wall portion 48. This allows placement of these components in their installed positions without the use of tools or other devices since the clamp 68 is yieldable under normal hand pressure by an ordinary installer.

It should be apparent to those skilled in the art that the embodiment described heretofore is considered to be the presently preferred form of this invention. In accordance with the Patent Statues, changes may be made in the disclosed apparatus and the manner in which it is used without actually departing from the true spirit and scope of this invention.

What is claimed is:

1. A hermetic compressor including a casing having a side wall, a lower wall, and an upper wall provided with an opening and a vertically extending stud member secured to said upper wall;

an electric terminal disposed in said opening;

conductor pins arranged in said terminal including end portions projecting outwardly from said casing;

a terminal receptacle block assembly having female terminals removably receiving said end portion of said conductor pins;

a thermal overload protector including a base wall located on said casing upper wall and having an upper wall with a central depression;

a retainer arrangement removably securing said terminal receptacle block relative to said electric terminal and said thermal overload protector relative to said casing upper wall comprising:

an arcuate resilient retainer means formed of stiffly flexible metal stock, the apex of said arcuate retainer means including an elongated central opening removably receiving said stud member, leg portions diverging downwardly and outwardly from said apex, a downward projection on the end portion of one of said leg portions removably engaging said depression on said upper wall of said thermal overload protector, a holding area on the end portion of the other of said leg portions removably engaging the upper end of said terminal receptacle block;

a post member threadably engaging said stud member including an enlargement which removably applies pressure on said apex of said retainer to cause its said end portions of said leg portions to forceably engage said terminal block and said thermal overload protector to removably secure said terminal receptacle block assembly relative to said conductor pins and removably securing said thermal overload protector relative to said compressor upper wall.

2. The invention recited in claim 1 wherein said stud member further includes a center post secured to said casing upper wall having a shoulder removably supporting said retainer means and a neck portion removably received in said elongated central opening, whereby said retainer means is secured between said shoulder and said enlargement and moveable through said elongated central opening for laterally positioning said resilient retainer means relative to said overload protector and said receptacle block assembly.

3. The invention recited in claim 2 wherein said thermal overload protector includes an inverted cup-shaped housing having its lower peripheral edge portions in a substantially flat plane.

4. The invention recited in claim 3 wherein said casing upper wall is formed to include a substantially flat portion removably receiving said lower peripheral edge portion of said thermal overload protector in intimate contact therewith.

* * * * *

UNITED STATES PATENT AND TRADEMARK OFFICE
CERTIFICATE OF CORRECTION

PATENT NO. : 4,508,987

DATED : April 2, 1985

INVENTOR(S) : William T. Ladusaw

It is certified that error appears in the above-identified patent and that said Letters Patent is hereby corrected as shown below:

In the drawing the ten (10) sheets of drawings should be deleted to be replaced with three (3) sheets of drawings as shown on the attached sheets.

The title page showing the illustrative figure should be deleted to appear as per attached title page.

Signed and Sealed this

Twenty-ninth Day of October 1985

[SEAL]

Attest:

Attesting Officer

DONALD J. QUIGG

Commissioner of Patents and Trademarks—Designate

United States Patent [19]

Ladusaw

[11] Patent Number: 4,508,987
[45] Date of Patent: Apr. 2, 1985

[54] HERMETIC COMPRESSOR INCLUDING A TERMINAL BLOCK AND THERMAL PROTECTION RETAINER MEANS

[75] Inventor: William T. Ladusaw, Louisville, Ky.

[73] Assignee: General Electric Company, Louisville, Ky.

[21] Appl. No.: 597,683

[22] Filed: Apr. 6, 1984

[51] Int. Cl.³ .......................................... H02K 11/00
[52] U.S. Cl. .................................. 310/68 C; 361/22; 361/418; 361/426
[58] Field of Search ..................... 361/22, 25–27, 361/331, 334, 380, 386, 388, 389, 392, 417, 418, 419, 426; 174/52 R; 339/91 R, 119 R; 310/68 R, 68 C, 68 B

[56] References Cited
U.S. PATENT DOCUMENTS
4,181,393 1/1980 Lill .................................. 310/68 C Primary Examiner—G. P. Tolin
Attorney, Agent, or Firm—Frank P. Giacalone; Radford M. Reams

[57] ABSTRACT

In a hermetic compressor there is provided a resilient retainer member adapted to removably secure a terminal receptacle block assembly and a thermal overload protector relative to the compressor casing. The receptacle block assembly is adapted to engage conductor pins of an electrical terminal secured to the upper wall of the casing while the overload protector is arranged on a substantially flat portion of the upper wall of the casing. The retainer member is arcuately shaped with its downwardly diverging end portions adapted to engage the receptacle block and thermal protector respectively. A downward force on the apex of the retainer member forces its end portions to securely hold the receptacle block in electrical contact with the conductor pins and thermal protector in intimate contact with the upper wall of the compressor casing.

4 Claims, 5 Drawing Figures

FIG. 1